United States Patent
Yamada

(12) United States Patent (10) Patent No.: US 7,625,597 B2
Yamada (45) Date of Patent: Dec. 1, 2009

(54) METHOD FOR PRODUCING A COLOR FILTER, APPARATUS FOR MANUFACTURING A COLOR FILTER, ELECTROOPTIC APPARATUS, AND ELECTRONIC DEVICE

(75) Inventor: Yoshiaki Yamada, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 11/040,004

(22) Filed: Jan. 24, 2005

(65) Prior Publication Data

US 2005/0181287 A1    Aug. 18, 2005

(30) Foreign Application Priority Data

Feb. 16, 2004    (JP)    ............................. 2004-038323

(51) Int. Cl.
 *G02F 1/1335*  (2006.01)
(52) U.S. Cl. ...................................................... 427/162
(58) Field of Classification Search .................. 427/162
See application file for complete search history.

(56) References Cited

U.S. PATENT DOCUMENTS

| | | | | |
|---|---|---|---|---|
| 5,556,476 A | * | 9/1996 | Lei et al. | ..................... 118/728 |
| 5,618,338 A | * | 4/1997 | Kurabayashi et al. | .... 106/31.37 |
| 5,951,350 A | * | 9/1999 | Aoki et al. | ..................... 445/24 |
| 6,013,315 A | * | 1/2000 | Mandal | ....................... 427/240 |
| 6,086,197 A | * | 7/2000 | Kubota et al. | .................. 347/96 |
| 6,238,045 B1 | * | 5/2001 | Ono et al. | ...................... 347/96 |
| 6,331,047 B1 | * | 12/2001 | Muramatsu et al. | ........... 347/55 |
| 6,394,578 B1 | | 5/2002 | Akahira et al. | |
| 6,981,761 B2 | | 1/2006 | Usui et al. | |
| 2003/0012870 A1 | * | 1/2003 | Sakurada | ...................... 427/68 |

FOREIGN PATENT DOCUMENTS

| | | |
|---|---|---|
| CN | 1473107 A | 2/2004 |
| EP | 0885744 A1 | 12/1998 |
| JP | H10-291305 A | 11/1998 |
| JP | 2000-147241 A | 5/2000 |
| JP | 2002-122727 A | 4/2002 |
| JP | 2003-127343 A | 5/2003 |

* cited by examiner

*Primary Examiner*—Timothy H Meeks
*Assistant Examiner*—Nathan T Leong
(74) *Attorney, Agent, or Firm*—Global IP Counselors, LLP

(57) ABSTRACT

A method of manufacturing a color filter includes a step of providing a base having a target discharge area, a step of discharging a liquid such as dispersion medium to at least a portion of the target discharge area, and a step of discharging a droplet of functional material such as a coloring ink to the target discharge area. One of the surface tension and the viscosity of the dispersion medium is lower than the one of the surface tension and the viscosity of the coloring ink. With this method of manufacturing a color filter, it is possible to suppress inadequate wetting of the edges of a pixel area with the coloring ink.

6 Claims, 12 Drawing Sheets

METHOD FOR PRODUCING A COLOR FILTER, APPARATUS FOR MANUFACTURING A COLOR FILTER, ELECTROOPTIC APPARATUS, AND ELECTRONIC DEVICE

BACKGROUND OF THE INVENTION

1. Field of the Invention

The present invention relates to a method for manufacturing a color filter, an apparatus for manufacturing a color filter, a color filter thus manufactured, an electrooptic apparatus having such color filter, and electronic device having such electrooptic apparatus.

2. Background Information

Display apparatuses have been widely used as devices for displaying information in recent years in notebook computers, mobile telephones, personal digital assistants, and other electronic devices. Liquid crystal devices in which a color filter is disposed on a substrate to enable full color display have become commonplace. Methods for manufacturing such color filters can be classified by the material of the coloring portion and the manufacturing process, and the inkjet method has been proposed as a way to manufacture a color filter in which a large number of color filters are formed on a substrate by discharging colored ink from nozzles. In the inkjet method, droplets are discharged to a target film formation area, the discharged droplets wet the entire target film formation area, and the droplets are allowed to dry to form a target film. Examples of known film formation methods using ink jetting include methods of forming luminescent portions that are disposed in a matrix form in a matrix display apparatus, and methods of forming the filter elements of a color filter substrate. Japanese Laid-Open Patent Application No. 2003-127343 discloses such methods. The pixel areas of the liquid crystal display described above are commonly formed in a rectangular shape. In this case, a plurality of droplets is discharged in the form of a matrix inside each pixel area.

However, it is ordinarily difficult to discharge droplets to the periphery of the pixel area, and the droplets are discharged to a position near the center of the pixel area. Since the distance from the edge of the droplet to the corner of the edge of the pixel area is far, it takes time for the discharged droplet to wet the pixel area by reaching all the way to the edge of the pixel area. There is also a drawback in that the droplets do not tend to spread to the edge of the pixel area due to the surface tension of the droplets discharged to the pixel area. The production efficiency of color filter substrates is therefore compromised. When drying begins before the discharged droplets wet the entire pixel area, it is difficult to form a color filter uniformly in the pixel area.

In view of the above, it will be apparent to those skilled in the art from this disclosure that there exists a need for an improved method for manufacturing a color filter, an apparatus for manufacturing a color filter, a color filter thus manufactured, an electrooptic apparatus having such color filter, and an electronic device having such electrooptic apparatus thus that overcome the problems of the known art. This invention addresses this need in the art as well as other needs, which will become apparent to those skilled in the art from this disclosure.

SUMMARY OF THE INVENTION

The present invention was contrived to solve the above-described problems, and an object thereof is to provide a method of manufacturing a color filter whereby it is possible to form a color filter with uniform color saturation and to improve efficiency with which such color filters are manufactured.

Another object of the present invention is to provide electrooptic apparatuses having such color filter and electronic device having such electrooptic apparatus, which have an excellent display quality.

The method of manufacturing a color filter according to one aspect of the present invention includes providing a base having a target discharge area, discharging a functional material to the target discharge area on the base, and discharging a liquid to at least a portion of the target discharge area on the base. One of surface tension and viscosity of the liquid is lower than the one of the surface tension and the viscosity of the functional material.

The apparatus for manufacturing a color filter of the present invention includes a stage on which a base having a target discharge area is adapted to be placed, a plurality of discharge heads having a first discharge head filled with a functional material, and a second discharge head filled with a liquid, and a control unit operatively coupled to the stage and the plurality of discharge heads, the control unit controlling the stage and the plurality of discharge heads such that the stage and the plurality of discharge heads move relative to each other and a droplet of the functional material from the first discharge head and a droplet of the liquid from the second discharge head are discharged in the same target discharge area. The surface tension or viscosity is lower than that of the functional material.

The color filter in accordance with another aspect of the present invention is produced by the method of manufacturing a color filter described above. The electrooptic apparatus in accordance with another aspect of the present invention is provided with such color filter. Examples of such electrooptic apparatus include liquid crystal displays, organic electroluminescent display apparatuses, plasma display apparatuses, and other display apparatuses. Also, the electronic device in accordance with still another aspect of the present invention is provided with such electrooptic apparatus.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4(*b*) is a cross sectional view of the discharge unit of the head of the color filter manufacturing apparatus in accordance with the present invention, viewed along the line 4B-4B shown in FIG. 4(*a*);

FIG. 6(*b*) is a timing chart of the signals to be transmitted from the head drive unit of the color filter manufacturing apparatus in accordance with the present invention;

FIG. 7(*b*) is a plan view of the color filter in accordance with the present invention;

DETAILED DESCRIPTION OF THE PREFERRED EMBODIMENTS

Figure 1:
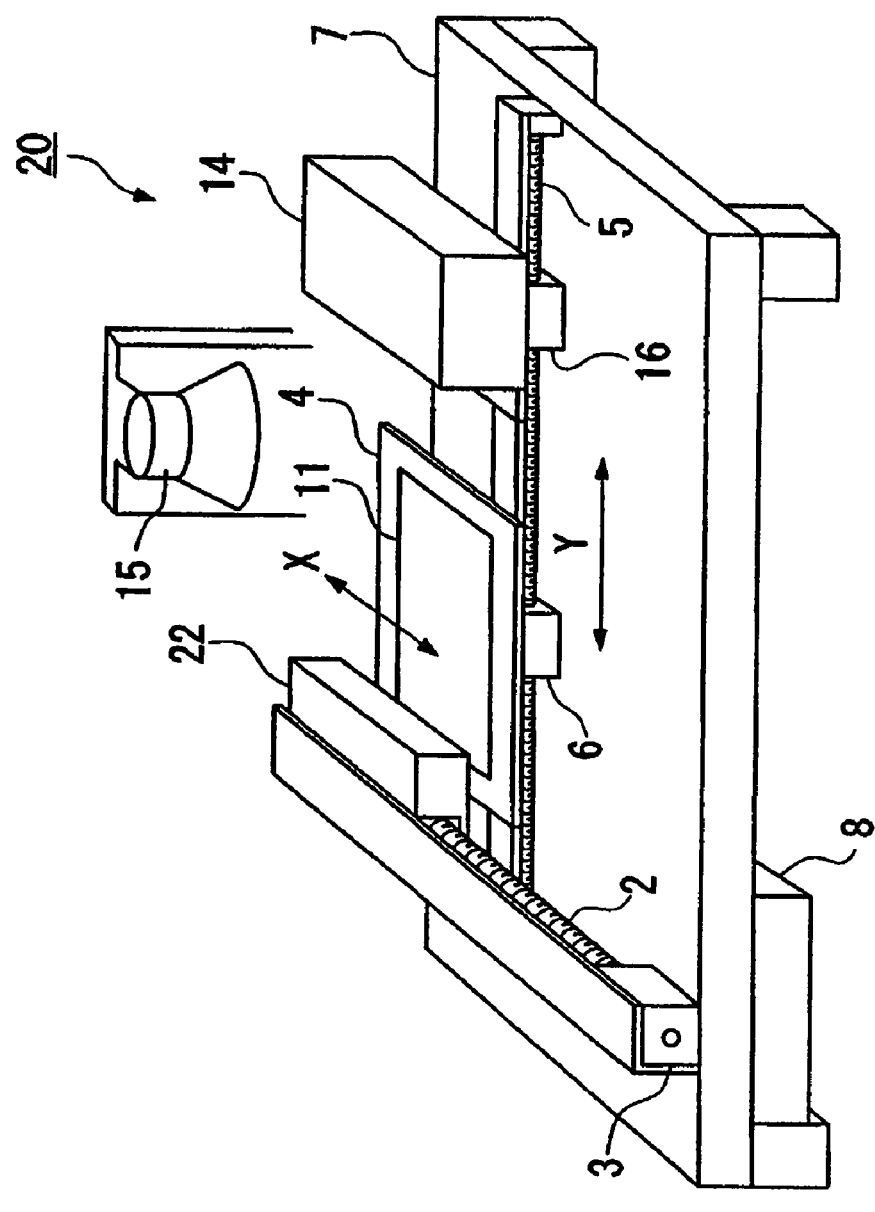
FIG. 1 is a schematic diagram of the color filter manufacturing apparatus in accordance with an embodiment of the present invention.

The method of manufacturing a color filter according to one aspect of the present invention includes providing a base having a target discharge area, discharging a functional material to the target discharge area on the base, and discharging a liquid to at least a portion of the target discharge area on the base. One of surface tension and viscosity of the liquid is lower than the one of the surface tension and the viscosity of the functional material.

In accordance with such a configuration, liquid is discharged to the target discharge area together with the functional material. Since the surface tension or viscosity of the discharged liquid is low in comparison with the functional material, the functional material can wet the entire area of the target discharge area quickly. As a result, since the liquid has already wetted the entire area on the substrate, the discharged functional material wets the entire area, and a uniform film can be formed. Here, the liquid can be discharged to the target discharge area before or after the discharge of the functional material to the target discharge area. For instance, when the functional material is first discharged to the target area on the base and failed to adequately wet the area, the liquid having a lower surface tension or viscosity than that of the functional material is thereafter discharged, causing the functional material to wet the entire predetermined area and allowing a uniform film to be formed.

In the method of manufacturing a color filter according to another aspect of the present invention, the discharging of the liquid is performed before the discharging of the droplet of functional material.

In accordance with such a configuration, liquid is first discharged to a predetermined area on the substrate. Since the surface tension or viscosity of the discharged liquid is low in comparison with the functional material, the liquid can wet the entire area of the target discharge area. Next, the functional material is discharged to the area immediately after the area has been covered with the liquid. As a result, since the liquid has already wetted the entire area on the substrate, the discharged functional material wets the entire area, and a uniform film can be formed.

In the method of manufacturing a color filter according to another aspect of the present invention, the liquid is discharged toward an edge portion of the target discharge area on the base.

In accordance with such a configuration, the liquid whose surface tension or viscosity is lower than that of the functional material is discharged solely to the edge portion of the target discharge area, which is ordinarily difficult to wet with a liquid material. Here, the functional material wets the entire predetermined area because the functional material is discharged onto the previously discharged liquid material.

In the method of manufacturing a color filter according to another aspect of the present invention, the liquid is a solvent for the functional material.

In accordance with such configuration, since the liquid does not contain a solute, and hence has lower viscosity in comparison with the functional material, making it possible to prevent insufficient wetting along the edges of the target discharge area. The liquid is a solvent for the functional material, and therefore blends well without causing unintentional chemical reactions even when these materials are handled simultaneously.

In the method of manufacturing a color filter according to another aspect of the present invention, the liquid includes a hot boiling point solvent for the functional material, and the functional material includes coloring ink.

In the method of manufacturing a color filter according to another aspect of the present invention, the liquid is discharged only toward the edge portion of the target discharge area on the base. Since the liquid can be discharged solely to the edge portions of the area, the amount of liquid discharge can be reduced in comparison with the case in which the liquid is discharged to the entire target discharge area. Consumption of the liquid can therefore be reduced and economic efficiency improved.

In the method of manufacturing a color filter according to another aspect of the present invention, the surface tension of the liquid is lower than that of the functional material.

The apparatus for manufacturing a color filter of the present invention includes a stage on which a base having a target discharge area is adapted to be placed, a plurality of discharge heads having a first discharge head filled with a functional material, and a second discharge head filled with a liquid, and a control unit operatively coupled to the stage and the plurality of discharge heads, the control unit controlling the stage and the plurality of discharge heads such that the stage and the plurality of discharge heads move relative to each other and a droplet of the functional material from the first discharge head and a droplet of the liquid from the second discharge head are discharged in the same target discharge area. The surface tension or viscosity is lower than that of the functional material.

In accordance with such a configuration, the first discharge heads discharge the functional material to the target discharge area on the base. The second discharge heads discharge a liquid whose surface tension or viscosity is lower than that of the functional material in the target discharge area. The discharged liquid has a low surface tension or viscosity in comparison with that of the functional material. Therefore, functional material can wet the entire predetermined area on the target discharge area. Here, the functional material can be discharged before or after the discharge of the liquid from the second discharge head. When the liquid is discharged from the second discharge head first, since the liquid has already wetted the entire area on the target discharge area, the functional material also wets the entire target discharge area, and a uniform film can be formed. Also, when the first discharge head first discharges the functional material to the target discharge area on the base, the target discharge area may not always be adequately wetted with the functional material, but since the second discharge heads discharge the liquid whose surface tension or viscosity is lower than that of the functional material, the functional material wets the entire predetermined area, allowing a uniform film to be formed.

The color filter in accordance with another aspect of the present invention is produced by the method of manufacturing a color filter described above. The electrooptic apparatus in accordance with another aspect of the present invention is provided with such color filter. Examples of such electrooptic apparatus include liquid crystal displays, organic electroluminescent display apparatuses, plasma display apparatuses, and other display apparatuses. Also, the electronic device in accordance with still another aspect of the present invention is provided with such electrooptic apparatus.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

The apparatus for producing a color filter and the method for manufacturing a color filter according to the first embodiment of the present invention are described in detail with reference to the diagrams.

Apparatus for Manufacturing a Color Filter

FIG. 1 is a schematic perspective view of the manufacturing apparatus for a color filter 20 according to the present embodiment. The manufacturing apparatus for a color filter 20 has a carriage 22, an X-axis direction guide shaft 2 for driving the carriage 22 along the X-axis direction, and an X-axis direction drive motor 3 for rotating the X-axis direction guide shaft 2, as shown in FIG. 1. Also, the manufacturing apparatus for a color filter 20 has a stage 4 for mounting a base 11, a Y-axis direction guide shaft 5 for driving the stage 4 along the Y-axis direction, a Y-axis direction drive motor 6 for rotating the Y-axis direction guide shaft 5, and a base 7 to which the X-axis direction guide shaft 2 and the Y-axis direction guide shaft 5 are each fixed in predetermined positions. A control unit 8 is provided to the lower portion of the base 7. The manufacturing apparatus for a color filter 20 is furthermore provided with a cleaning mechanism 14 and a heater 15.

The X-axis direction drive motor 3 moves the carriage 22 along the X-axis direction and the Z-axis direction, which is orthogonal to the X-axis direction and the Y-axis direction, in accordance with signals from the control unit 8. The X-axis direction drive motor 3 furthermore has a function of turning the carriage 22 about an axis parallel to the Z-axis direction. The Y-axis direction drive motor 6 moves the stage 4 along the Y-axis direction and the Z-axis direction in accordance with signals from the control unit 8. The Y-axis direction drive motor 6 furthermore has a function of turning the carriage 22 about the center of an axis parallel to the Z-axis direction, as described above.

In the present embodiment, the X-axis direction may be described as the sub-scanning direction, and the Y-axis direction may be described as the main scanning direction. The imaginary origin of the X-, Y-, and Z-axes directions is fixedly defined relative to the reference portion of the manufacturing apparatus for a color filter 20. The Z-axis direction is the direction parallel to the vertical direction (direction of gravitational acceleration).

The stage 4 has a plane parallel to both of the X- and Y-axes directions. The stage 4 is configured so as to be capable of fixedly supporting or holding thereon the base 11 that has a target discharge area to which predetermined material is to be discharged. The stage 4 is fixedly held to the Y-axis direction guide shaft 5, and the Y-axis direction drive motor 6 is connected to the Y-axis direction guide shaft 5. The Y-axis direction drive motor 6 is a stepping motor or the like, and the Y-axis direction guide shaft 5 turns when a Y-axis direction drive pulse signal is transmitted from the control unit 8. The stage 4 moves along the Y-axis direction in association with the turning of the Y-axis direction guide shaft 5.

The carriage 22 is fixedly held to the X-axis direction guide shaft 2, and the X-axis direction drive motor 3 is connected to the X-axis direction guide shaft 2, as described above. The X-axis direction drive motor 3 is a stepping motor or the like, and the X-axis direction guide shaft 2 turns when an X-axis direction drive pulse signal is transmitted from the control unit 8. The carriage 22 moves along the X-axis direction in association with the rotation of the X-axis direction guide shaft 2. Thus, ink is discharged by causing the stage 4 to scan along the X-axis direction, and the carriage 22 along the Y-axis direction, with respect to the base 11 mounted on the stage 4. It should be noted that the stage 4 and the carriage 22 can move relative to each other while the stage 4 remains stationary and the carriage 22 alone is moved along the X-axis direction, or while the carriage 22 remains stationary and the stage 4 alone is moved along the Y-axis direction. In other words, "relative movement" or "relative scanning" includes moving only one of the stage 4 and the carriage 22 with respect to the other. The details regarding the carriage 22 are described later.

The control unit 8 calculates the relative position, discharge amount, and other parameters regarding the coloring ink 16 (an example of functional material) and dispersion medium 17 (liquid with a lower surface tension or viscosity than that of the function material) to be discharged, and discharge data is output to the inkjet head groups 26 and stage 4 on the basis of this calculated discharge data. The details regarding the control unit 8 are described later.

Configuration of the Heads

Figure 2:
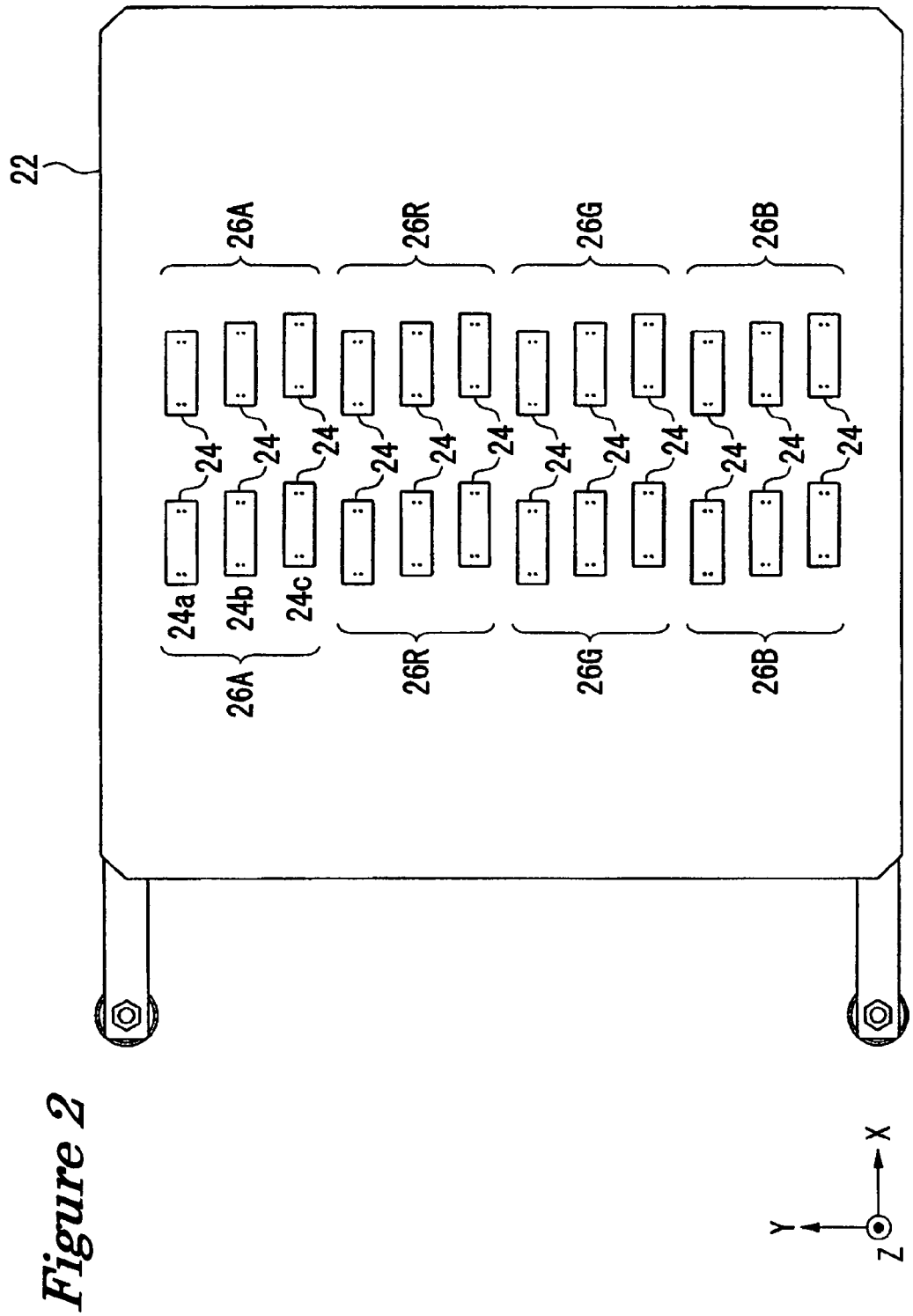
FIG. 2 is a view of the bottom surface of the carriage of the color filter manufacturing apparatus in accordance with the embodiment of the present invention, viewed from the stage side.

FIG. 2 is a schematic diagram showing the configuration of the heads 24 viewed from the base 11. A plurality of heads 24 having substantially the same configuration is mounted on the carriage 22, as shown in FIG. 2. Two rows each having 12 heads 24 are mounted on the carriage 22 along the Y-axis direction. The 12 heads 24 in each row are divided into four sets of head groups 26 (head groups 26A, 26R, 26G, and 26B). In other words, the four sets of head groups 26 include: the head group 26A (first discharge heads) in which the heads 24 are filled solely with dispersion medium 17 used to disperse or dissolve the coloring ink 16, the head group 26R in which the heads 24 are filled with red coloring ink 16R (second discharge heads), the head group 26G in which the heads 24 are filled with green coloring ink 16G (second discharge heads), and the head group 26B in which the heads 24 are filled with blue coloring ink 16B (second discharge heads). In the present embodiment, the head group 26A in which dispersion medium 17 alone is filled discharges dispersion medium 17 to an entire pixel area on the substrate before any of the above-described head groups 26R, 26G, and 26B discharges colored inks 16R, 16G, and 16B to the pixel area.

Each head groups 26 is provided with three heads 24, as described above. The positions of these three heads 24 are arranged so as to be offset in the lengthwise direction of the heads 24. The three heads 24 that are in each of the head groups 26 are referred to as head 24a, head 24b, and head 24c in the order from the top to bottom along the Y axis direction. The head 24a of the head group 26A, the head 24a of the head group 26R, the head 24a of the head group 26G, and the head 24a of the head group 26B are disposed in the same position on the X axis direction. In a similar fashion, the heads 24b and 24c of the head groups 26A, 26R, 26G, and 26B are also disposed on the same positions on the X axis direction.

In accordance with such a configuration, the colored inks 16R, G and B can be discharged from the head groups 26 to the pixel area immediately after the dispersion medium 17 has been discharged from the head group 26A. As a result, the colored inks 16R, G, and B can be discharged before the dispersion medium 17 previously discharged to the pixel area evaporates.

Additionally, in accordance with such a configuration, since the discharge medium 17 initially discharged onto the substrate does not contain coloring ink 16, the viscosity is low in comparison with a dispersion medium that contains the coloring ink 16. The dispersion medium 17 initially discharged onto the substrate therefore wets the entire pixel area on the base 11. Right after that, one of the colored inks 16R, G, and B is discharged immediately thereafter to the pixel area completely wetted by the dispersion medium 17. The coloring ink 16 therefore wets the entire pixel area. As a result, nonuniformity caused by insufficient wetting of the edges of the pixel area on the substrate can be prevented, and a uniform film can be formed.

Here, butyl carbitol acetate (BCTAC) or the like is preferably used as the dispersion medium 17 filled in the head group 26A. Other examples of a high-boiling solvents suitable as the dispersion medium other than the above-described dispersion medium 17 include solvents based on diethylene glycol dialkyl ethers expressed by the formula $R^1$—O(CH$_2$CH$_2$O)$_2$—$R^2$ (wherein $R^1$ and $R^2$ each independently represent an alkyl group with a carbon number of 4 to 10); solvents based on triethylene glycol dialkyl ethers expressed by the formula $R^3$—O(CH$_2$CH$_2$O)$_3$—$R^4$ (wherein $R^3$ and $R^4$ each independently represent an alkyl group with a carbon number of 1 to 10); solvents based on polyethylene glycol dialkyl ethers expressed by the formula $R^5$—O(CH$_2$CH$_2$O)$_i$—$R^6$ (wherein $R^5$ and $R^6$ each independently represent an alkyl group with a carbon number of 1 to 10, and i is an integer from 4 to 30); solvents based on propylene glycol dialkyl ethers expressed by the formula $R^7$—OCH(CH$_3$)CH$_2$O—$R^8$ (wherein $R^7$ and $R^8$ mutually independently represent an alkyl group with a carbon number of 4 to 10); ester based solvents such as those based on glycerol triacetate (triacetin), di-n-butyl maleate, di-n-butyl fumarate, n-butyl benzoate, dimethyl phthalate, diethyl phthalate, di-n-propyl phthalate, di-i-propyl phthalate, di-n-butyl phthalate, di-amyl salicylate, and the like. It should be noted that the organic solvent of the coloring ink 16 is a solvent with a boiling point of 250° C. or higher at one atmospheric pressure (hereinafter referred to as "high-boiling point solvent").

In the present invention, an organic solvent with a boiling point of lower than 250° C. (hereinafter referred to as "low-boiling point solvent") may be jointly used with the high-boiling point solvent. Examples of such low-boiling point solvent include ethylene glycol monoalkyl ethers such as ethylene glycol monomethyl ether, ethylene glycol monoethyl ether; ethylene glycol monoalkyl ether acetates such as ethylene glycol monomethyl ether acetate; diethylene glycol monoalkyl ethers such as diethylene glycol monomethyl ether; diethylene glycol monoalkyl ether acetates such as diethylene glycol monomethyl ether acetate; propylene glycol monoalkyl ether acetates such as propylene glycol monomethyl ether acetate; ethers such as diethylene glycol dimethyl ether; alcohols such as 1-octanol; ketones such as methyl ethyl ketone; carboxylic acids such as caproic acid; alkyl esters of lactic acid such as 2-hydroxypropionic acid methyl; and other esters such as 2-hydroxy-2-methyl propionic acid ethyl; aromatic hydrocarbons such as toluene and xylene. The amount of a low-boiling point solvent to be used, is ordinarily 20 wt % or less, and preferably 5 wt % or less, with respect to the total weight of the high-boiling point solvent and the low-boiling point solvent.

A predetermined amount of dispersion medium 17 is blended with the coloring ink 16R, coloring ink 16G, and coloring ink 16B filled in the heads 24, such that the coloring ink is dispersed or dissolved in this blended dispersion medium 17. This is due to the fact that the viscosity of the discharged ink must be set to a low value in order to allow the droplets of ink to be discharged from the inkjet nozzles without blocking the nozzles. The coloring ink 16 has pigments, binder resins, and high-boiling point solvents (organic solvents) as required components, and in certain cases may also contain multifunctional monomers, photoinitiators, or other additives.

The color tone of the pigment is not particularly limited to any specific colors, and may be suitably selected in accordance with how the resulting color filter is designed to be used. A pigment, dye, or natural coloring matter may be used, but an organic pigment or inorganic pigment is used in particular.

Examples of suitable organic pigments include compounds classified as "Pigments" in the Color Index (C.I.; published by The Society of Dyers and Colourists), and more specifically include Pigment Yellows such as C.I. Pigment Yellow 1, 3, 12; Pigment Oranges such as C.I. Pigment Orange 1, 5, 13; Pigment Reds such as C.I. Pigment Red 1, 2, 3; and Pigment Blues such as C.I. Pigment Blue 15, 15:3, 15:4. These organic pigments may be used singly, or as a mixture of two or more of them.

Examples of the inorganic pigment include titanium oxide, barium sulfate, calcium carbonate, zinc flower, lead sulfate, yellow lead, red oxide (red iron oxide (III)), cadmium red, ultramarine, Prussian blue, chrome oxide green, cobalt green, amber, titanium black, synthetic black iron oxide, carbon black, and other inorganic pigments.

The binder resin is preferably a polymer containing a carboxylic group, particularly a copolymer (hereinafter referred to as a "carboxyl group-containing copolymer (B1)") composed of an ethylenic unsaturated monomer having at least one carboxyl group (hereinafter referred to as a "carboxyl group-containing unsaturated monomer") and another polymerizable ethylenic unsaturated monomer (hereinafter referred to as "other unsaturated monomer (b1)"). Examples of the carboxyl group-containing unsaturated monomer include acrylic acid, methacrylic acid, and crotonic acid.

Examples of the other unsaturated monomer (b1) include styrene, vinyl toluene, methoxystyrene, vinyl benzyl methyl ether, and other aromatic vinyl compounds, as well as methyl acrylate, methyl methacrylate, and other unsaturated carboxylic acid esters.

The carboxyl group-containing copolymer (B1) is preferably a copolymer composed of acrylic acid and/or methacrylic acid and at least one type of compound out of styrene, methyl acrylate, methyl methacrylate, 2-hydroxyethyl acrylate, 2-hydroxyethyl methacrylate, benzyl acrylate, benzyl methacrylate, polystyrene macromonomer, and polymethyl methacrylate macromonomer The surface tension of the dispersion medium 17 is preferably in a range of 0.02 N/m or higher and 0.07 N/m or lower. If the surface tension is less than 0.02 N/m when the liquid is discharged by the inkjet method, a flight curve tends to occur because the wetting characteristics of the ink composition on the nozzle surface increase. When the surface tension exceeds 0.07 N/m, control of the discharge amount and timing becomes difficult because the shape of the meniscus does not stabilize at the tip of the nozzle.

In order to adjust the surface tension, a nonionic-based, fluorine-based, or silicone-based surface tension adjuster can be added in a small amount to the dispersion medium 17 in a range doing so does not unreasonably reduce the contact angle with the base 11. The nonionic surface tension adjuster is useful for improving the wetting characteristics of the liquid relative to the base, thereby improving the leveling characteristics of the film, preventing occurrence of bumps and peeling in the film, and providing other advantages.

The dispersion medium 17 may contain organic compounds such as alcohols, ethers, esters, ketones as required.

The viscosity of the dispersion medium 17 is preferably 1 mpa.s or higher and 50 mPa·s or lower. The is because if the viscosity is less than 1 mPa·s when the ink is discharged with the inkjet method, the area around the nozzle is easily soiled by the ink flow, and if the viscosity is higher than 50 mPa·s, the nozzles tend to get clogged more the frequently, and it is difficult to achieve smooth droplet discharge.

The dispersion medium 17 filled the head group 26A and the dispersion medium 17 loaded into the head group 26R, G and B may be of the same type or of different types.

Figure 3:
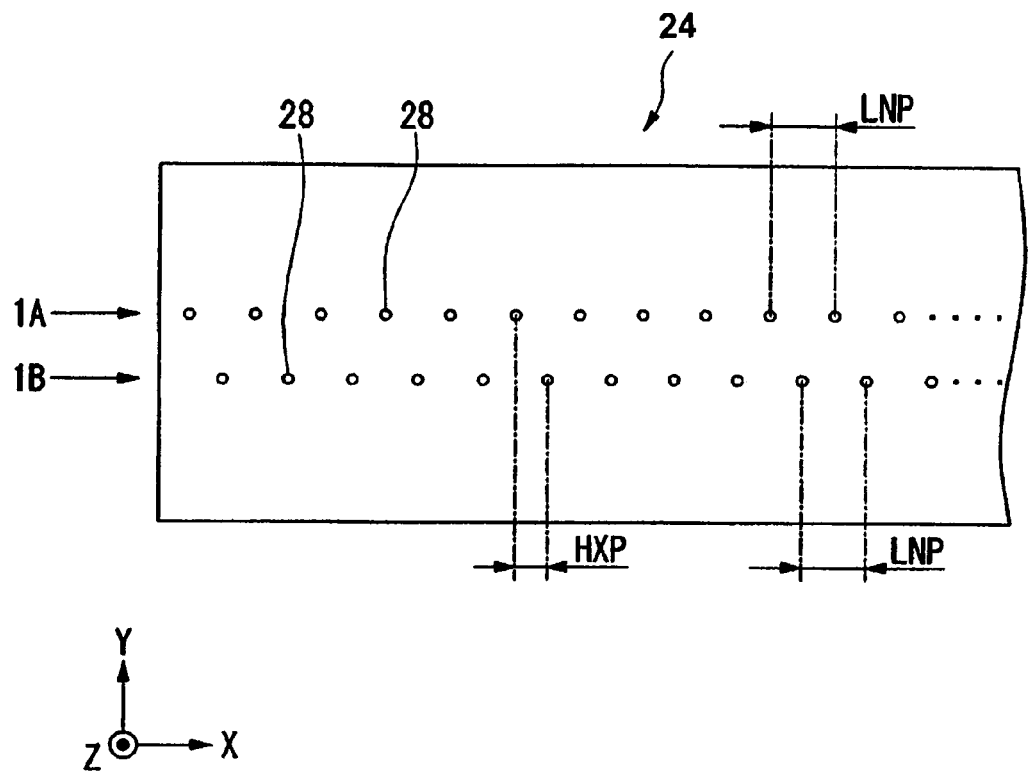
FIG. 3 is a view of the bottom surface of the head of the color filter manufacturing apparatus in accordance with the present invention, viewed from the stage side.

FIG. 3 shows the bottom surface of one of the heads 24. The shape of the bottom surface of the heads 24 is configured as a polygon having two long sides and two short sides. The lengthwise direction of the bottom surface of the heads 24 corresponds to the X-axis direction, and the width direction corresponds to the Y-axis direction. Also, the bottom surface of the heads 24 faces the stage 4.

A plurality of nozzles 28 is formed as ink discharge ports on the bottom surface of the head 24. It should be noted that in the present embodiment 180 nozzles 28 are disposed with a predetermined spacing HXP therebetween. The nozzles 28 aligned in two nozzle rows 1A and 1B are aligned in a staggered fashion along the X-axis direction. Also, 90 nozzles 28 are aligned with a predetermined spacing LPN in each of the nozzle rows 1A and 1B. However, several nozzles 28 on each end of the nozzle rows 1A and 1B are designated as "inactive nozzles" from which ink is not discharged, and the other nozzles 28 are designated as "discharge nozzles" from which ink is to be discharged. Piezoelectric elements 38 are separately provided to each of the nozzles 28, as described below. As a result, the nozzles 28 can independently carry out the discharge operation. In other words, the discharge amount of the droplets, the discharge time, and other discharge parameters can be controlled for each nozzle 28 in accordance with the electrical signal fed to the piezoelectric elements 38.

Figure 4:
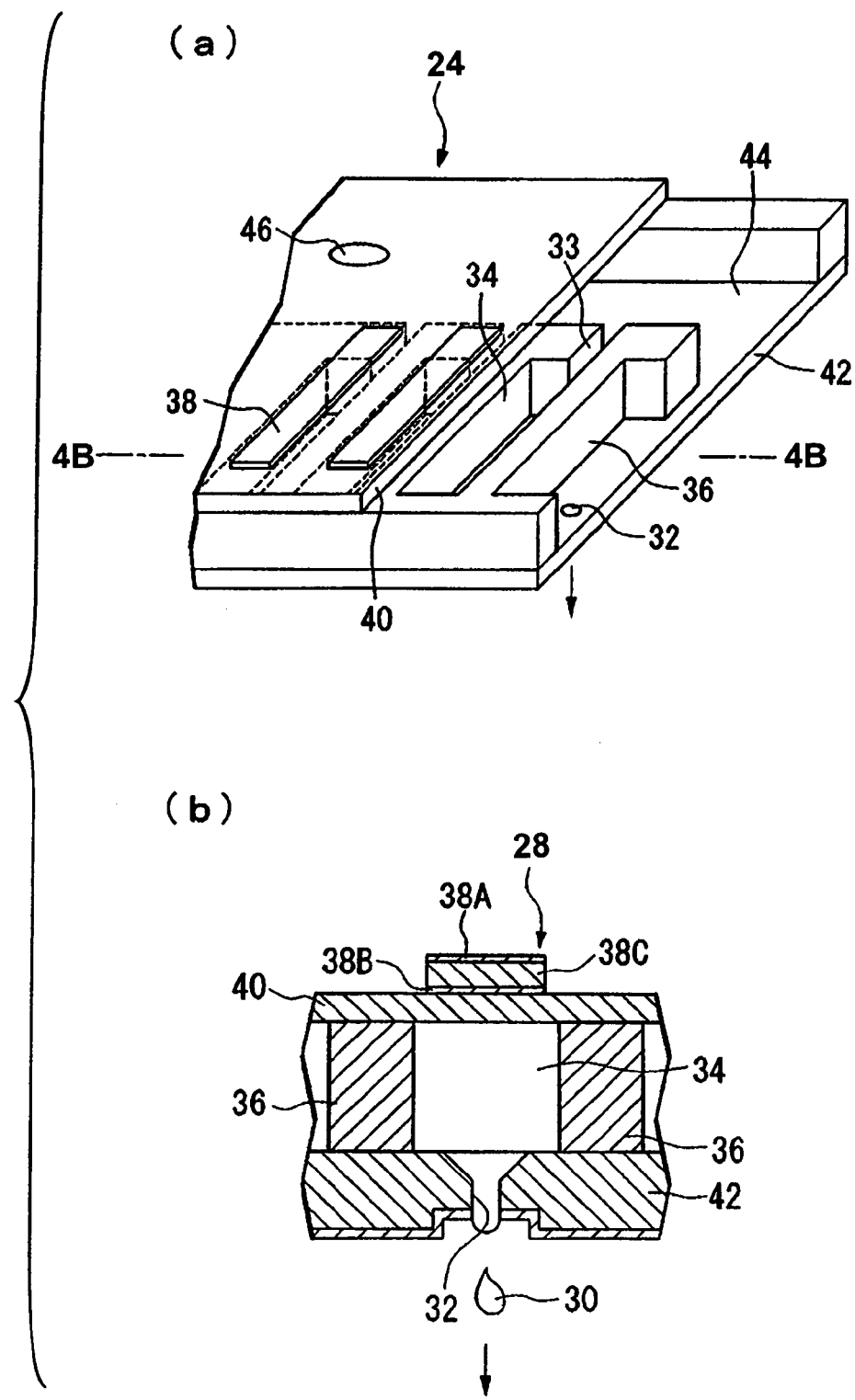
FIG. 4(*a*) is a perspective view showing the configuration of the discharge unit of the head of the color filter manufacturing apparatus in accordance with the present invention.

FIG. 4(a) is a perspective view showing the configuration of the discharge unit of a head 24. The discharge unit of the head 24 is provided with a nozzle plate 42 and a vibration plate 40, and these components are connected via a plurality of partitions 36. A plurality of cavities 34 and a liquid reservoir 44 are formed by the plurality of partitions 36. The plurality of cavities 34 and the liquid reservoir 44 are connected via supply ports 33. The liquid reservoir 44 is connected to a hole 46, and the coloring ink 16 or the dispersion medium 17 is fed through the hole 46 to be filled in the liquid reservoir 44 and cavities 34. Nozzles 28 for discharging the coloring ink 16 or the dispersion medium 17 from the cavities 34 are formed in the nozzle plate 42.

FIG. 4(b) is a cross-sectional view along the line B-B of the head 24 shown in FIG. 4(a). A piezoelectric element 38 is configured so that a piezoelement 38C is held between a pair of electrodes 38A and 38B. The control unit 8 applies a predetermined voltage to the pair of electrodes 38A and 38B. The piezoelectric element 38 to which voltage has been applied mechanically vibrates so that the piezoelectric element 38 and the vibration plate 40 vibrate in unison due to the piezoelectric effect. The pressure inside the cavity 34 is varied thereby, and the coloring ink 16 or the dispersion medium 17 is fed from the supply port 33 to the liquid reservoir 44 and the cavity 34. When the voltage applied to the piezoelectric element 38 is stopped in such a state, the piezoelectric element 38 and vibration plate 40 return to their original states, the pressure in the cavity 34 therefore changes again, and the ink in the cavities 34 is discharged from the nozzle hole 32 of the nozzle 28 to the base. It should be noted that an electrothermal converter may be used instead of a piezoelement.

Control Unit

Figure 5:
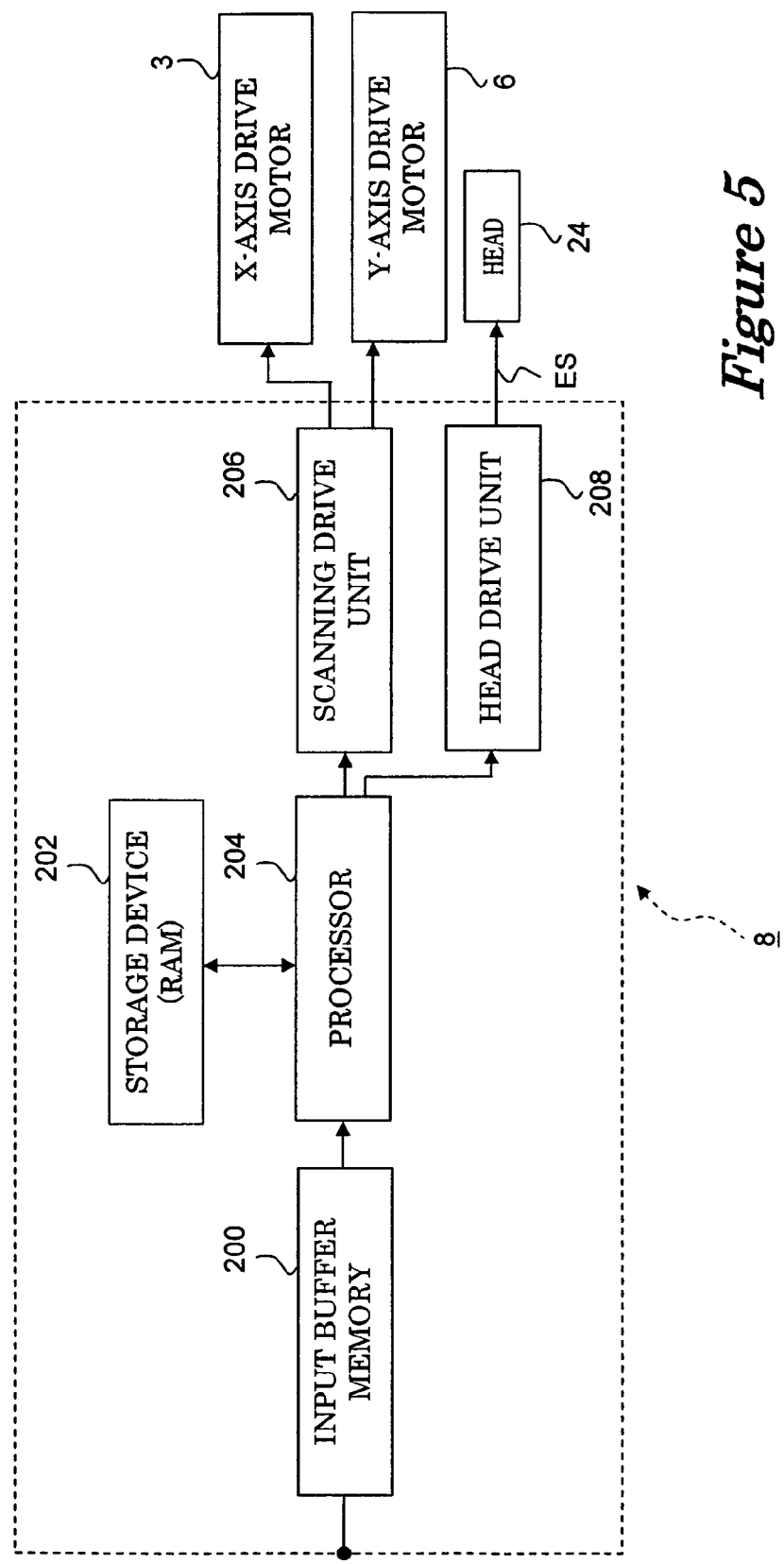
FIG. 5 is a block diagram showing the configuration of the control unit of the color filter manufacturing apparatus in accordance with the present invention.

FIG. 5 is a block diagram showing the configuration of the control unit 8. The control unit 8 is operatively connected to the X-axis direction drive motor 3, the Y-axis direction drive motor 6, and the heads 24, so as to be selectively controllable. The control unit 8 has an input buffer memory 200. The input buffer memory 200 receives ink discharge data from an external information processing apparatus. The discharge data is composed of data indicating the relative position of all the target discharge areas on the base, data indicating the number of relative scans required to apply the ink up to a predetermined thickness in all the target discharge areas, data specifying nozzles that will function as ON (discharge) nozzles, and data specifying nozzles that will function as OFF (inactive) nozzles. The input buffer memory 200 feeds the discharge data to the processor 204, and the processor 204 stores the discharge data in the storage device 202. It should be noted that the storage device 202 in FIG. 5 is RAM.

Figure 6:
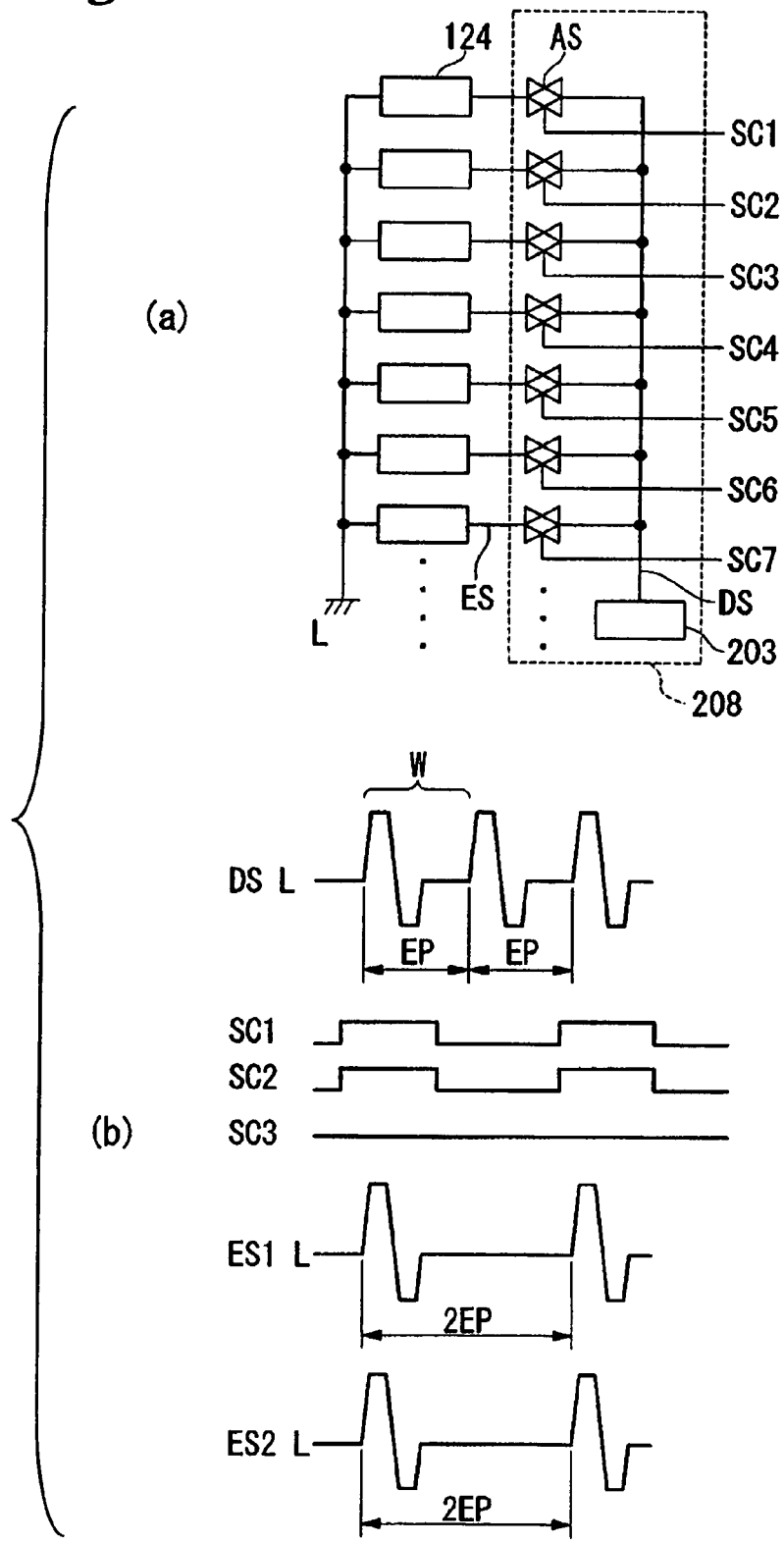
FIG. 6(*a*) is a block diagram showing the configuration of the head drive unit of the color filter manufacturing apparatus in accordance with the present invention.

The processor 204 sends the scan drive unit 206 data indicating the relative positions of the nozzles with respect to the target discharge area on the base based on the discharge data in the storage device 202. The scan drive unit 206 sends the X-axis direction drive motor 3 and the Y-axis direction drive direction motor 6 shown in FIG. 5 drive signals correlated with the discharge data and the discharge cycle EP shown in FIG. 6. As a result, the head 24 scans the target discharge area in a relative fashion. The processor 204, on the other hand, sends the head drive unit 208 selection signals SC for specifying the ON/OFF state of the nozzles at each discharge timing based on the discharge cycle EP and the discharge data stored in the storage device 202. The head drive unit 208 sends the head 24 ejection signals ES, which are required for ink discharge, based on the selection signals SC. As a result, ink is discharged as droplets from the designated nozzles 28 of the head 24.

FIG. 6(a) is a block diagram showing the configuration of the drive head unit. FIG. 6(b) is a timing chart of the signals in the head drive unit. The head drive unit 208 has a single drive signal generator 203 and a plurality of analog switches AS, as shown in FIG. 6(a). The analog switches AS are provided for each of the piezoelectric elements 38 in the head 24. The drive signal generator 203 is designed to generate and feed a drive signal DS to the analog switches AS. The drive signal DS contains a plurality of discharge waveforms W that are repeated in the discharge cycle EP, as shown in FIG. 6(b). The discharge waveform W corresponds to the drive voltage waveform that is to be applied between the pairs of electrodes 38A and 38B of the corresponding piezoelectric element 38 in order to discharge a single droplet from the nozzle 28.

The volume of the droplets to be discharged from the head 24 is controlled by the discharge waveform W. In view of the above, the data of the discharge waveform W that allows droplets of a predetermined volume to be discharged is input to the drive signal generator 203, and the drive signal generator 203 generates a drive signal DS based on the discharge waveform W data. However, the drive signal generator 203 may be configured to receive the data indicating the required volume of the droplets, calculate a discharge waveform W from the data, and automatically generate a drive signal DS. In this case, a table for correlating the volume of the droplets and the discharge waveform W is input to the drive signal generator 203 in advance. With such a configuration, the amount of data input to the drive signal generator 203 can be reduced.

A plurality of selection signals SC (SC1, SC2, . . . ) for controlling the ON/OFF state of the nozzles 28 is fed to the analog switches AS shown in FIG. 6(a). The selection signals SC can assume either a high level state or a low level state, as shown in FIG. 6(b). The analog switches AS shown in FIG. 6(a) feed ejection signals ES (ES1, ES2, . . . ) to one of the electrodes 38A and 38B in the piezoelectric element 38 in accordance with the drive signal DS and the selection signals SC. When the selection signal SC is at a high level, a drive signal DS is transmitted as an ejection signal ES, as shown in FIG. 6(b). Conversely, when the selection signal SC is at a low level, a reference potential L is transmitted as the ejection signal ES. Since the reference potential L is provided to the other of the electrodes 38A and 38B in the piezoelectric element 38, the coloring ink 16 or the dispersion medium 17 is discharged from the nozzle 28 corresponding to the piezoelectric element 38 when a drive signal DS is applied to one electrode in the piezoelectric element 38, as shown in FIG. 6(a).

Structure of the Color Filter

Figure 7:
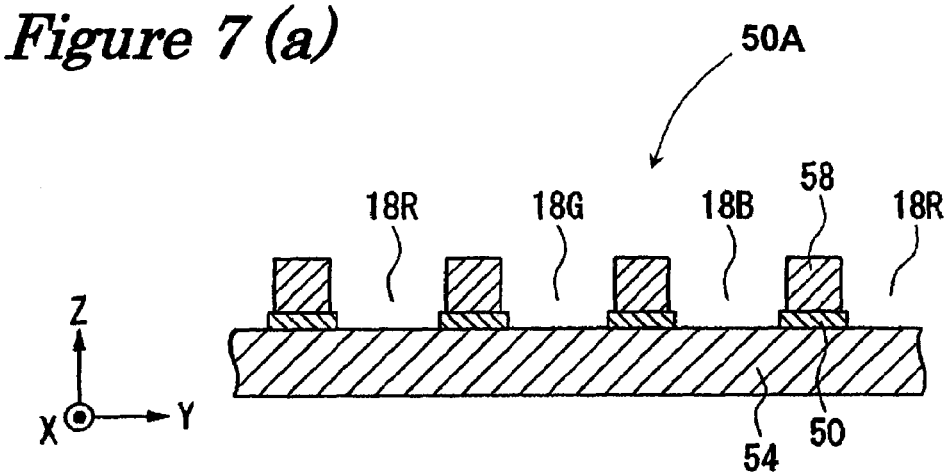
FIG. 7(*a*) is a cross-sectional view of the color filter in accordance with another aspect of the present invention.
Figure 7:
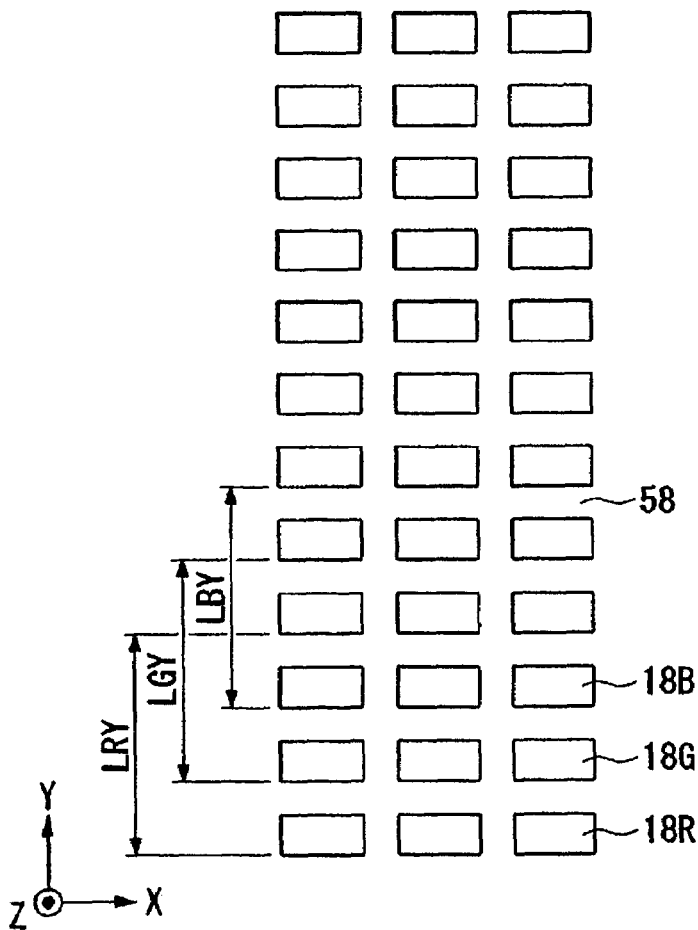

FIG. 7(a) is a cross-sectional view showing the structure of a color filter substrate. The color filter substrate 50A is provided with an optically transparent carrier base 54, a black matrix 50 formed on the carrier base 54, and a bank 58 formed on the black matrix 50. Pixel areas are formed in areas partitioned by the black matrix 50. The pixel areas partitioned and defined by the black matrix 50 are composed of target discharge areas 18R, 18G, and 18B in a predetermined pattern. The target discharge area 18R is an area in which a filter layer is to be formed for emission of light exclusively in the red wavelength range, the target discharge area 18G is an area in which a filter layer is to be formed for emission of light exclusively in the green wavelength range, and the target discharge area 18B is an area in which a filter layer is to be formed for emission of light exclusively in the blue wavelength range.

FIG. 7(b) is a plan view of the structure of the color filter. The substrate 50A is positioned in an imaginary plane that is parallel to both of the X- and Y-axes directions. The pixel area has a polygonal shape composed of long and short sides. The lengthwise direction of the pixel area corresponds to the X-axis direction, and the width direction corresponds to the Y-axis direction. The X- and Y-axes directions are orthogonal to each other. A plurality of target discharge areas 18R, 18G, and 18B formed on the carrier base 54 are periodically arranged in the form of a matrix. Specifically, the target discharge areas 18R, 18G, and 18B are each disposed in a single row along the X-axis direction, and are furthermore each periodically disposed in the cited order with a predetermined spacing along the Y-axis direction. The spacing between the target discharge areas 18R along the Y-axis direction in this case is the predetermined spacing LRY. The target discharge areas 18G and target discharge areas 18B are similarly disposed with predetermined spacing LGY and spacing LBY along the Y-axis direction.

Method of Manufacturing the Color Filter Substrate

Next, an example of the method of forming the color filter, black matrix 50, and bank 58 of the present embodiment is described below.

First, the black matrix 50 made of a black resin is formed on the carrier base 54. Specifically, a negative resist with a black pigment containing carbon particles or other particles, an acrylic or other type of resin monomer, and a polymerization initiator as main components are applied by spin coating or another method to the front surface of the carrier base 54, and the resist is thereafter prebaked. Next, the resist is exposed in a predetermined position using a photomask on which the pattern of the black matrix 50 is formed. The polymerization reaction of the monomer progresses and the exposed resist becomes a resin that is insoluble in a solvent. Lastly, the exposed unnecessary portions alone are allowed to remain by developing the resist, and a black matrix 50 with a predetermined pattern can be formed.

The black matrix 50 with a predetermined pattern composed of chromium or another metal, or a metal compound can be formed in the following manner, for example. First, a black matrix 50 with a predetermined pattern can be formed by depositing chromium or another metal, or a metal compound in the form of a film across the entire surface of the carrier base 54 by sputtering or another method, and thereafter forming a predetermined pattern by photolithography.

Next, a bank 58 is formed on the black matrix 50 obtained by the above-described method. The bank 58 is formed by applying a photosensitive resist for the bank 58 to the entire surface of the carrier base 54 by spin coating or another method, exposing and developing the resist with the same method as when the black matrix 50 composed of black resin was formed, and forming a bank 58 with a predetermined pattern.

Next, a color filter is formed using the manufacturing apparatus for a color filter. In the present embodiment, the inkjet method is adopted as the manufacturing apparatus for a color filter.

Figure 8:
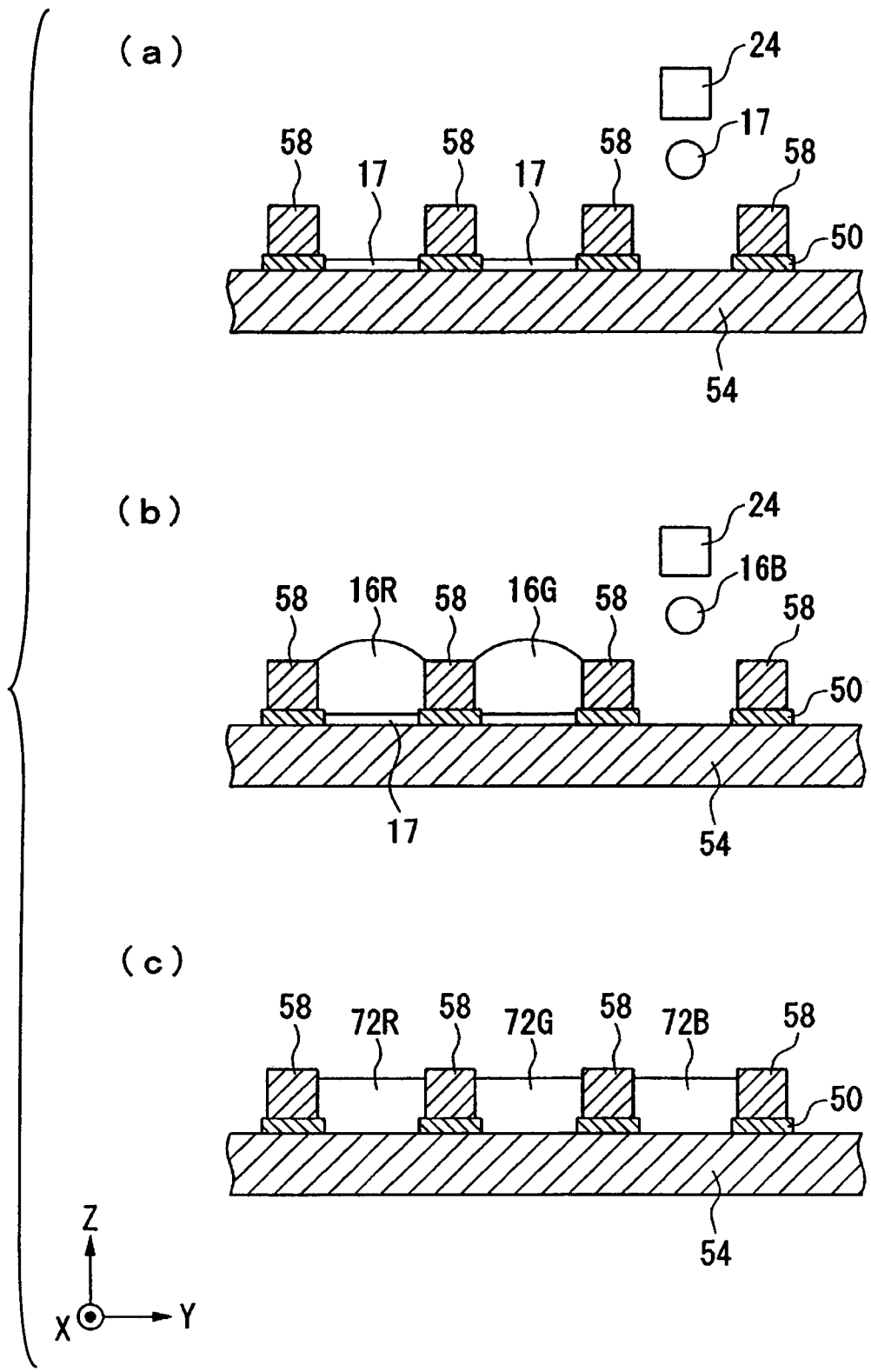
FIG. 8 is a diagram showing the steps of manufacturing the color filter in accordance with another aspect of the present invention.

FIG. 8(a) is a diagram showing the step of discharging the dispersion medium 17 to a target discharge area 18 on the base 54. First, the control unit 8 causes the bottom surface of the heads 24 of the carriage 22 mounted on the manufacturing apparatus for a color filter to face the carrier base 54, as shown in the diagram. The dispersion medium 17 is discharged from the nozzles 28 of the head 24A to the pixel areas on the carrier base 54 as the carriage 22 is moved relative to the carrier base 54. At this time, the X-axis direction of the target discharge areas 18 and the nozzles 28 of the heads 24 are aligned so as to be substantially parallel, and the dispersion medium 17 is sequentially discharged from the nozzles 28 of the heads 24A when the nozzles 28 arrive at the areas above the target discharge areas 18.

Specifically, the carriage 22 begins to scan in the width direction of the pixel area, that is, along the Y-axis direction. This scanning causes the rows 1A, 1B, 2A, 2B, 3A, and 3B of nozzles 28 of the head groups 26A to enter into the target discharge areas 18R to which the dispersion medium 17 is to be discharged. The rows 1A, 1B, 2A, 2B, 3A, and 3B of the nozzles 28 discharge the dispersion medium 17 in sequence as they arrive in the areas above the target discharge areas 18R. The head groups 26A subsequently enters into the target discharge areas 18G that are adjacent along the Y-axis direction (main scanning direction) to the target discharge areas 18R to which the dispersion medium 17 has been discharged, and the dispersion medium 17 is discharged onto the target discharge areas 18G. Next, the head groups 26A sequentially enter into the target discharge areas 18B that are adjacent to the target discharge area 18G along the Y-axis direction, and the dispersion medium 17 is discharged onto the target discharge area 18G. In this manner, the head groups 26A discharge the dispersion medium 17 to all the target discharge areas 18, instead of discharging the dispersion medium 17 exclusively to specific target discharge areas 18 of the head groups 26R, G, or B.

This action is carried out with respect to all the target discharge areas 18R, G, and B, which are disposed in the scanning direction of the Y-axis direction, and the dispersion medium 17 is thus discharged. When the scan along the Y-axis direction is completed, the control unit 8 causes the head groups 26A to move in a relative fashion along the X-axis direction. When the head groups 26A move to the target discharge areas 18R that are adjacent along the X-axis direction, scanning is started once again along the Y-axis direction, and the dispersion medium 17 is discharged by repeating the above-described method with respect to all the target discharge areas 18R, G, and B to which the dispersion medium 17 has not yet been discharged.

Banks 58 that function as partitions 36 are formed along the periphery of the pixel areas that form the target discharge areas 18R, G, and B. The dispersion medium 17 should be preferably discharged so that center portions of the coloring inks 16R, G, and B discharged to the target discharge areas 18R, G, and B are higher than the highest bank 58, and yet the coloring inks 16 do not flow into neighboring pixel areas.

FIG. 8(b) is a diagram showing the step for discharging the coloring inks 16 to be performed after the step of discharging the dispersion medium 17. The head groups 26A subsequently pass over the target discharge areas 18R, and the head groups 26R enter the target discharge areas 18R as shown in the diagram. Since the target discharge areas 18R correspond to the head groups 26R, the control unit 8 sends a drive signal DS to the piezoelectric elements 38 so as to cause the coloring ink 16R to be discharged to the target discharge areas 18R.

The head groups 26R are configured so that the rows 1A, 1B, 2A, 2B, 3A, and 3B of nozzles 28 of the head groups 26R sequentially enter the target discharge areas 18R to which the dispersion medium 17 has been discharged, as described above. When the rows 1A, 1B, 2A, 2B, 3A, and 3B of nozzles 28 sequentially arrive above the target discharge areas 18R, the coloring ink 16R is sequentially discharged. The head groups 26R subsequently enter the target discharge areas 18G that are adjacent along the Y-axis direction to the target discharge areas 18R to which the coloring ink 16R has been discharged. In this case, since the head groups 26R do not need to discharge the coloring ink 16R to the target discharge area 18G, no discharge occurs. The head groups 26R enter into the target discharge areas 18B that are adjacent to the target discharge areas 18G along the Y-axis direction, and next target discharge areas that are adjacent in the Y-axis direction. The coloring ink 16R is discharged when the head groups 26R above the next target discharge areas 18R.

This action is carried out with respect to all the target discharge areas 18R disposed in the scanning direction of the Y-axis direction, and the coloring ink 16R is discharged. When the scan along the Y-axis direction is completed, the control unit 8 causes the head group 26R to move in a relative fashion along the X-axis direction. When the head group 26R moves to the target discharge area 18R that is adjacent along the X-axis direction, scanning is started once again along the Y-axis direction, and the coloring ink 16R is discharged by repeating the above-described method for all the target discharge areas 18R to which the coloring ink 16R has not yet been discharged.

In a similar fashion, the head groups 26G and 26B discharge coloring inks 16G and 16B to their corresponding target discharge areas 18.

As a drying step, the carrier base 54 is subsequently placed in a drying oven for 10 minutes at 100° C. to vaporize the dispersion medium 17. The drying temperature should be in a range of 30° C. to 200° C., and the drying time should be two minutes or more.

FIG. 8(c) is a diagram showing the drying step after the coloring ink 16 has been discharged. A color filter having the coloring portions R, G, B in a predetermined pattern is formed by heating the coloring portions formed in the target discharge areas 18R, G, and B at a temperature of about 150° C. to 270° C., and baking (curing) the coloring portions R, G, B, as shown in this diagram.

In accordance with the present embodiment, the dispersion medium 17 is first discharged to a pixel area on the base. The dispersion medium 17 is less viscous than the coloring ink 16 dispersed or dissolved in the dispersion medium 17. For this reason, the dispersion medium 17 has a low contact angle with the base and therefore is able to wet the entire pixel areas quickly on the base.

The coloring inks 16 that have been dispersed or dissolved in the dispersion medium 17 are discharged to the pixel areas on the base immediately after the dispersion medium 17 has been discharged. As a result, since the dispersion medium 17 has already wetted the entire pixel areas on the base, the coloring ink 16 that is subsequently dispersed or dissolved in the dispersion medium 17 can wet the entire pixel areas quickly, and a uniform film can be formed.

Alternative Manufacturing Method

Described above is the case in which the dispersion medium 17 loaded into the head group 26A is discharged to the entire pixel areas. Described below is the case in which the dispersion medium 17 is discharged to the edges of the pixel areas. It should be noted that other than the fact that the dispersion medium 17 is discharged to the edges of the pixel area, the steps described herein is the same as the method for manufacturing a color filter described above. Therefore, description of steps of the method of manufacturing a color filter of the alternative embodiment that are similar to those of the above-described method if manufacturing a color filter of the first embodiment is omitted.

Figure 9:
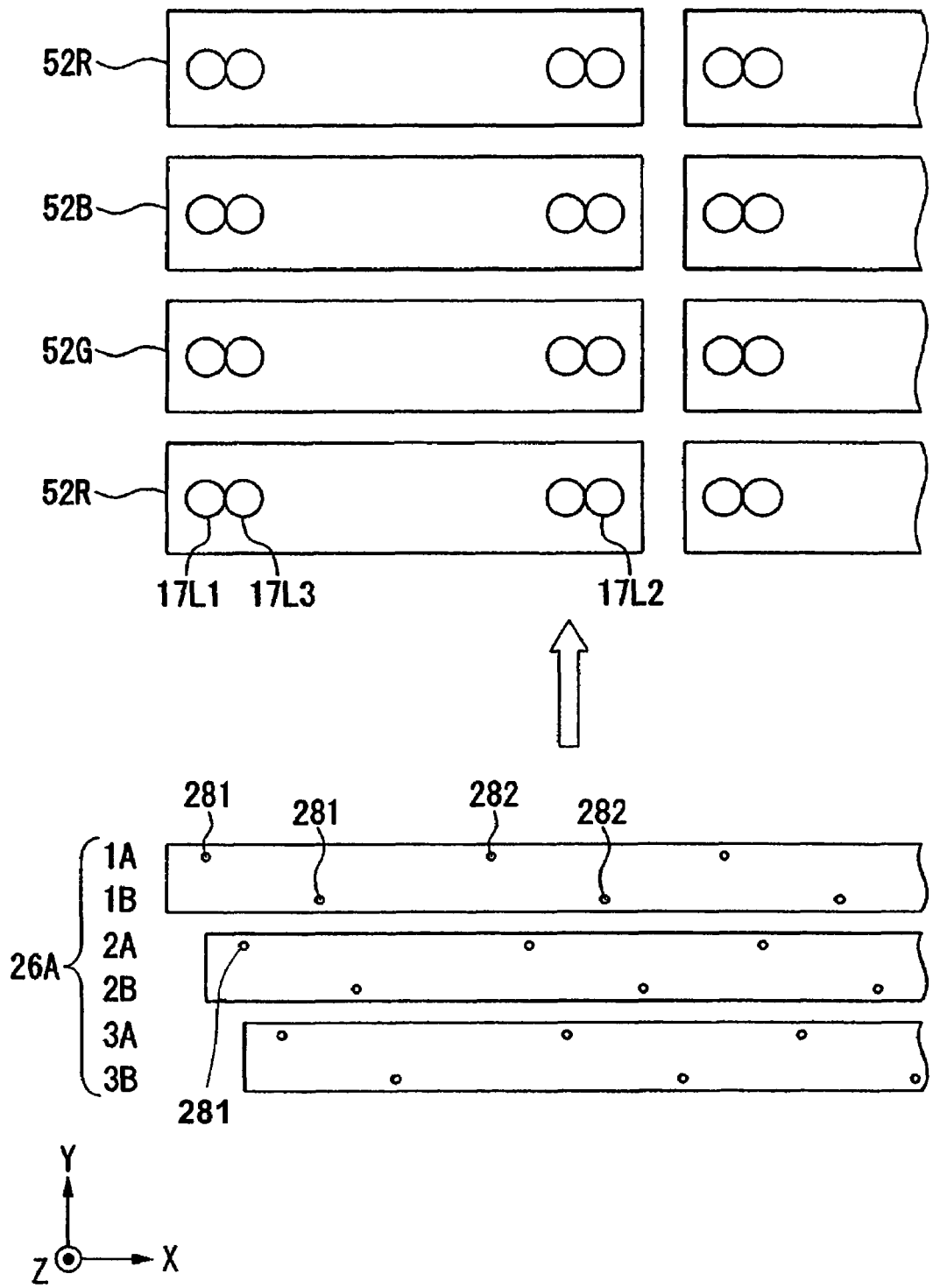
FIG. 9 is a diagram of showing the steps of manufacturing the color filter in accordance with another embodiment of the present invention, in which a liquid is discharged to the edge portion of the pixel area.

FIG. 9 is a schematic view of the case in which the liquid material is discharged to the edges of the pixel area. The head groups 26A scan along the Y-axis direction the target discharge areas 18R to which the dispersion medium 17 is to be discharged. The rows 1A, 1B, 2A, 2B, 3A, and 3B of nozzles 28 of the head group 26A enter into the target discharge areas 18R in this order. At this time, the control unit 8 selects rows of nozzles 28 of the head groups 26A that are at positions that overlap with the positions of the edges of the target discharge areas 18R, and the dispersion medium 17 is discharged toward the edges of the target discharge areas 18R.

First, when row 1A of the nozzles 28 in the heads 24a of the head group 26A enters the target discharge area 18R, for example, the control unit 8 selects the nozzles 28 that will come to positions above the edges of the target discharge areas 18R from among the nozzles 28 disposed in row 1A. In the present embodiment, the nozzle 281 of row 1A will reach position exactly above the edge of the target discharge area 18R. Therefore, the control unit 8 transmits a drive signal DS for discharging the dispersion medium 17L1 from nozzle 281 to the piezoelectric element 38 corresponding to nozzle 281. As a result, the dispersion medium 17L1 is discharged from the nozzle 281 of row 1A toward the edge of the target discharge areas 18R.

Next, row 1B of the nozzles 28 of head 24a enters the target discharge areas 18R. In this case, the control unit 8 selects nozzle 282 of row 1B of the nozzles 28 because nozzle 282 of row 1B will reach a position above the edge of the target discharge area 18R. The control unit 8 transmits a drive signal DS for discharging the dispersion medium 17L2 from the nozzle 282 of the row 1B to the piezoelectric element 38 corresponding to nozzle 282. As a result, the dispersion medium 17L3 is discharged from the nozzle 282 of row 1B toward the edge of the target discharge area 18R. Similarly, the nozzle 281 of the row 2A corresponds to the position of the edge of the target discharge area 18R. Thus, the dispersion medium 17L3 is discharged from the nozzle 281 of the row 2A.

In the similar manner, the nozzles 28 corresponding to the positions of the edges of the target discharge areas 18 are selected from the nozzles 28 of the other heads 24 in a similar fashion according to the method described above, and the dispersion medium 17 is discharged to the edges of the target discharge areas 18.

The control unit 8 transmits a drive signal DS for preventing the discharge of the dispersion medium 17 to nozzles 28 that do not correspond to positions of the edges of the target discharge area 18R. When row 1A of the nozzles 28 enters the target discharge area 18R, for example, the nozzle 282 of row 1A of the nozzles 28 is not associated with the edge of the target discharge area 18R, and a drive signal DS that prevents the discharge of the dispersion medium 17 is therefore transmitted to the piezoelectric element 38 corresponding to nozzle 282. As a result, the dispersion medium 17 is not discharged from the nozzle 282 corresponding to this piezoelectric element 38. The row 1A of the nozzles 28 enters the target discharge area 18G which is adjacent to the target discharge area 18R in the scanning direction, and the above-described discharge operation is repeated.

In a similar fashion in accordance with the method described above, when nozzles 28 of the other heads 24 are not positioned in positions that are associated with the edges of the target discharge areas 18, such nozzles 28 enter into the neighboring target discharge areas 18 without discharging the dispersion medium 17

In accordance with such a configuration, the dispersion medium 17 can be discharged only to the edges of the pixel area, which are ordinarily difficult to wet with liquid material alone. For this reason, the coloring ink 16 discharged onto the pixel area to which the dispersion medium 17 has already been discharged wets the entire pixel area, including the edges of the pixel area. As a result, a color film with uniform color saturation can be formed. Also, since the dispersion medium 17 is required to be discharged solely to the edges of the pixel area, the consumption of liquid material can be suppressed in comparison with the case in which the liquid material is discharged to the entire pixel area, resulting in an economically efficient method of manufacturing the color filter.

Electrooptic Apparatus

The electrooptic apparatus is composed of the color filter formed as described above. The general configuration of a liquid crystal display apparatus, which is an example of an electrooptic apparatus, will now be described with reference to FIGS. 10 and 11. In the present specification, the liquid crystal layer side is referred to as the "inner side" of the various elements of the liquid crystal display apparatus.

Figure 10:
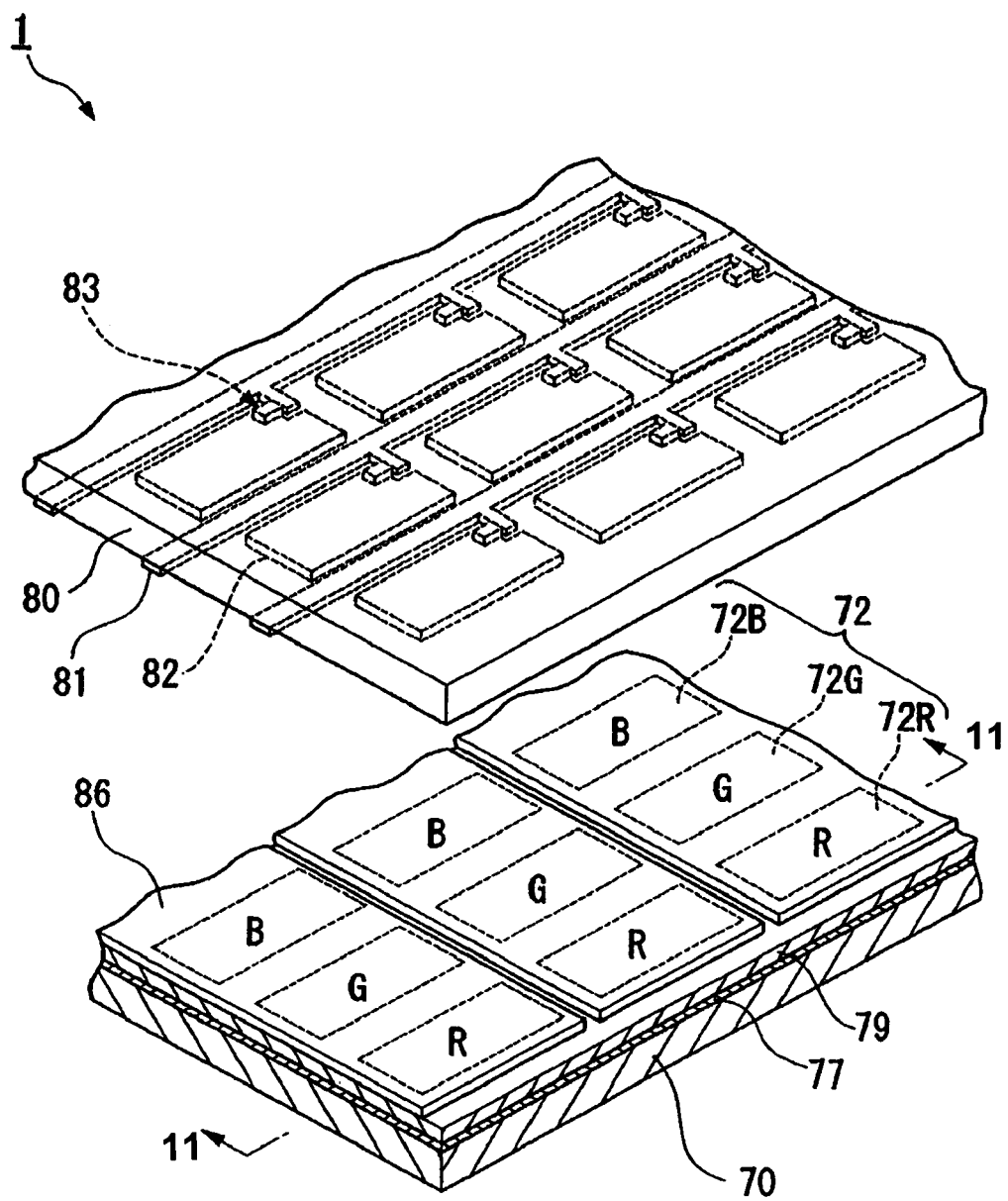
FIG. 10 is an exploded perspective view of the liquid crystal display as an embodiment of the electrooptic apparatus in accordance with still another aspect of the present invention.
Figure 11:
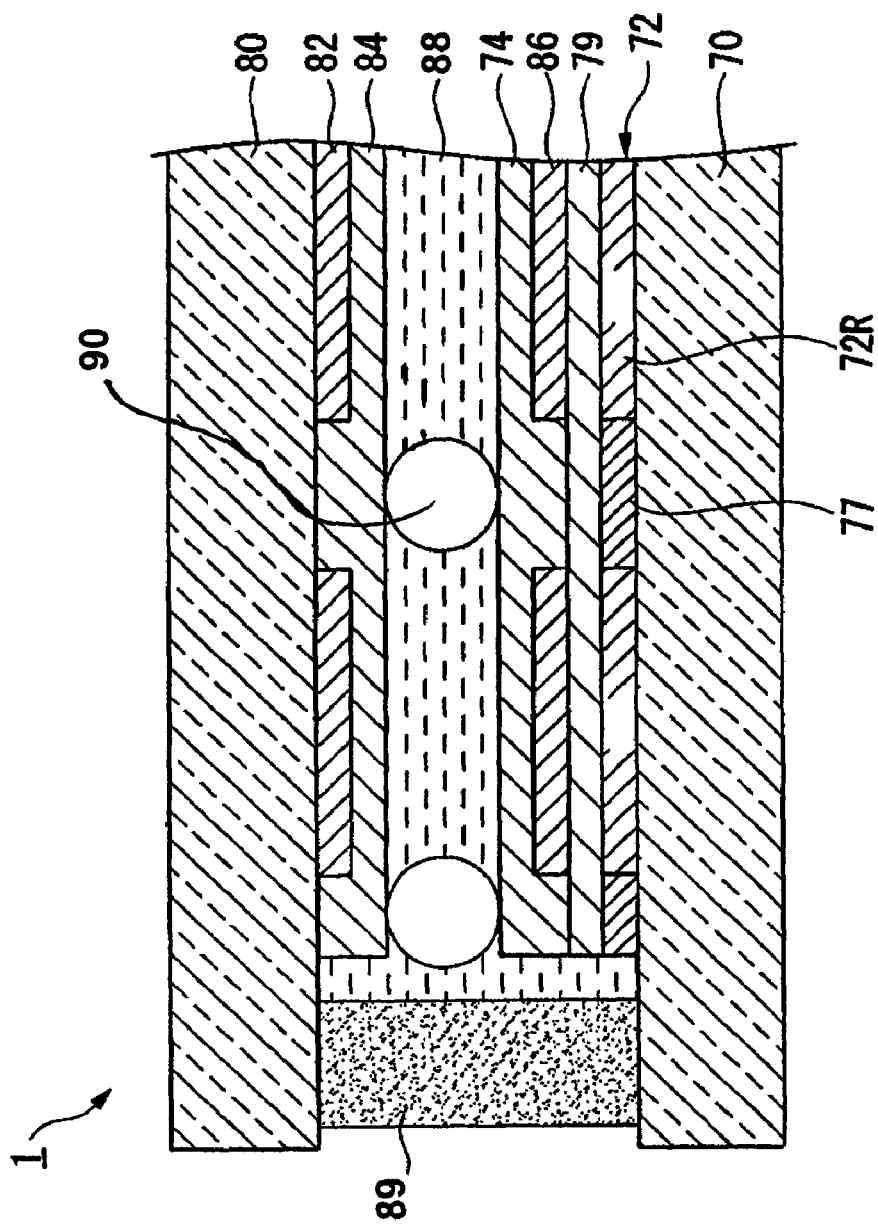
FIG. 11 is a cross-sectional side view of the liquid crystal display apparatus as the embodiment of the electrooptic apparatus of the present invention.

FIG. 10 is an exploded perspective view of the liquid crystal display apparatus 1, and FIG. 11 is a cross-sectional side view taken along the line 11-11 of FIG. 10. The liquid crystal display apparatus 1 is configured so as to hold a liquid crystal layer 88 between a first base 70 and a second upper base 80, as shown in FIG. 10. A nematic liquid crystal or another liquid crystal is used for the liquid crystal layer 88, and twisted nematic (TN) mode is adopted as the operating mode of the liquid crystal display apparatus 1. A liquid crystal other than that described above may be used, and an operating mode other than that described above may also be adopted. Described below is an example of an active matrix liquid crystal display apparatus that uses TFD elements as switching elements, but the present invention may be applied to an active matrix liquid crystal display apparatus other than the apparatus described below, or to a passive matrix liquid crystal display apparatus.

In the liquid crystal display apparatus 1, the first and second substrates 70 and 80, which are composed of glass or another transparent material, are disposed in opposing positions, as shown in FIG. 10.

A plurality of data lines 81 is formed on the inner side of the second base 80. A plurality of pixel electrodes 82 composed of ITO or another transparent electroconductive material is disposed in the form of a matrix on the side of the data lines 81. The pixel area is composed of areas for forming the pixel electrodes 82. The pixel electrodes 82 are connected to the data lines 81 via TFD elements 83. The TFD elements 83 are composed of a first electroconductive film primarily composed of Ta and formed on the surface of the second base 80, an insulating film primarily composed of $Ta_2O_3$ and formed on the surface of the first electroconductive film, and a second electroconductive film primarily composed of Cr and formed on the surface of the insulating film (so-called MIM structure). The first electroconductive film is connected to the data lines 81, and the second electroconductive film is connected to the pixel electrodes 82. The TFD elements 83 thereby function as switching elements that control passage of the current through the pixel electrodes 82.

A color filter film 72 is formed as described above on the inside of the first base 70. The color filter film 72 is composed of color filters 72R, 72G, and 72B in a substantially rectangular shape from a plan view. The color filters 72R, 72G, and 72B are composed of pigment or other coloring material that exclusively transmits their respectively different colors of light, and are disposed in the form of a matrix in correspondence with the pixel areas. Also, a light-blocking film 77 is formed on the periphery of the color filters in order to prevent light from intruding from neighboring pixel areas. This light-blocking film 77 is formed in the shape of a frame and is composed of black chromium metal or another material having light-absorbing properties. A transparent insulating film 79 is furthermore formed so as to cover the color filter film 22 and the light-blocking film 77.

A plurality of scanning lines is formed on the inside of the insulating film 79. The scanning lines are composed of ITO or another transparent electroconductive material, are formed in a substantially striped shape, and are extended in the direction orthogonal to the data lines 81 of the second base 80. The scanning lines are formed so as to cover the color filters 72R, 72G, and 72B, which are aligned in the direction in which the scanning lines extend, and are designed to function as counter electrodes.

When scanning signals are transmitted to the scanning lines and a data signal is transmitted to the data lines 81, an electric field is applied to the liquid crystal layer 88 by the opposing pixel electrodes 82 and the counter electrodes 86.

Orientation films 74 and 84 are formed so as to cover the pixel electrodes 82 and the counter electrodes 86, as shown in FIG. 11. The orientation films 74 and 84 control the orientation of the liquid crystal molecules when an electric field is applied to the liquid crystal layer 88. The orientation films 74 and 84 are composed of polyimide or another organic polymer material, and are provided with rubbed surfaces. The liquid crystal molecules in the lengthwise direction near the surface of the orientation films 74 and 84 align in the rubbing direction when an electric field is applied, and are designed to become aligned in a direction substantially parallel to the orientation films 74 and 84. It should be noted that the orientation films 74 and 84 are rubbed so that the orientation direction of the liquid crystal molecules near the surfaces of the orientation film 74 and the orientation direction of the liquid crystal molecules near the surface of the orientation film 84 are offset relative to each other by a predetermined angle. The liquid crystal molecules in the liquid crystal layer 2 are thereby designed to be helically laminated along the thickness direction of the liquid crystal layer 88.

The substrates 70 and 80 are joined at the periphery by a sealing material 89 composed of a heat-curing, UV-curing, or another type of curing adhesive. The liquid crystal layer 88 is sealed inside the space enclosed by the bases 70 and 80 and the sealing material 89. It should be noted that the thickness (cell gap) of the liquid crystal layer 88 is controlled by spacer particles 90 disposed between the two bases 70 and 80.

Polarizing plates (not shown) are disposed outside the first and second substrates 70 and 80. The polarizing plates are disposed so that the mutual polarization angles (transmission axes) are offset by a predetermined angle. Also, a backlight (not shown) is disposed outside the polarizing plate on the light incident side, which is below the first base 70 in FIG. 11.

The light emitted from the backlight is converted to linearly polarized light along the axis of polarization of the polarizing plate on the light incident side, and is allowed to enter the liquid crystal layer 88 from the first substrate 70. This linearly polarized light turns by a predetermined angle along the twisted direction of the liquid crystal molecules when passing through the liquid crystal layer 88 to which an electric field has not been applied, and leaves the polarizing plate on the light emitting side. White is thereby displayed (normally white mode) when an electric field is not applied. Conversely, when an electric field is applied to the liquid crystal layer 88, the liquid crystal molecules are oriented to become perpendicular to the orientation films 74 and 84 along the direction of the electric field. In this case, the linearly polarized light that has entered the liquid crystal layer 88 does not change direction and therefore does not leave the polarizing plate on the light emitting side. Black is thereby displayed when an electric field is applied. It should be noted that a grayscale can be displayed by manipulating the strength of the applied electric field.

The liquid crystal display apparatus 1 is configured as described above.

Electronic Device

Figure 12:
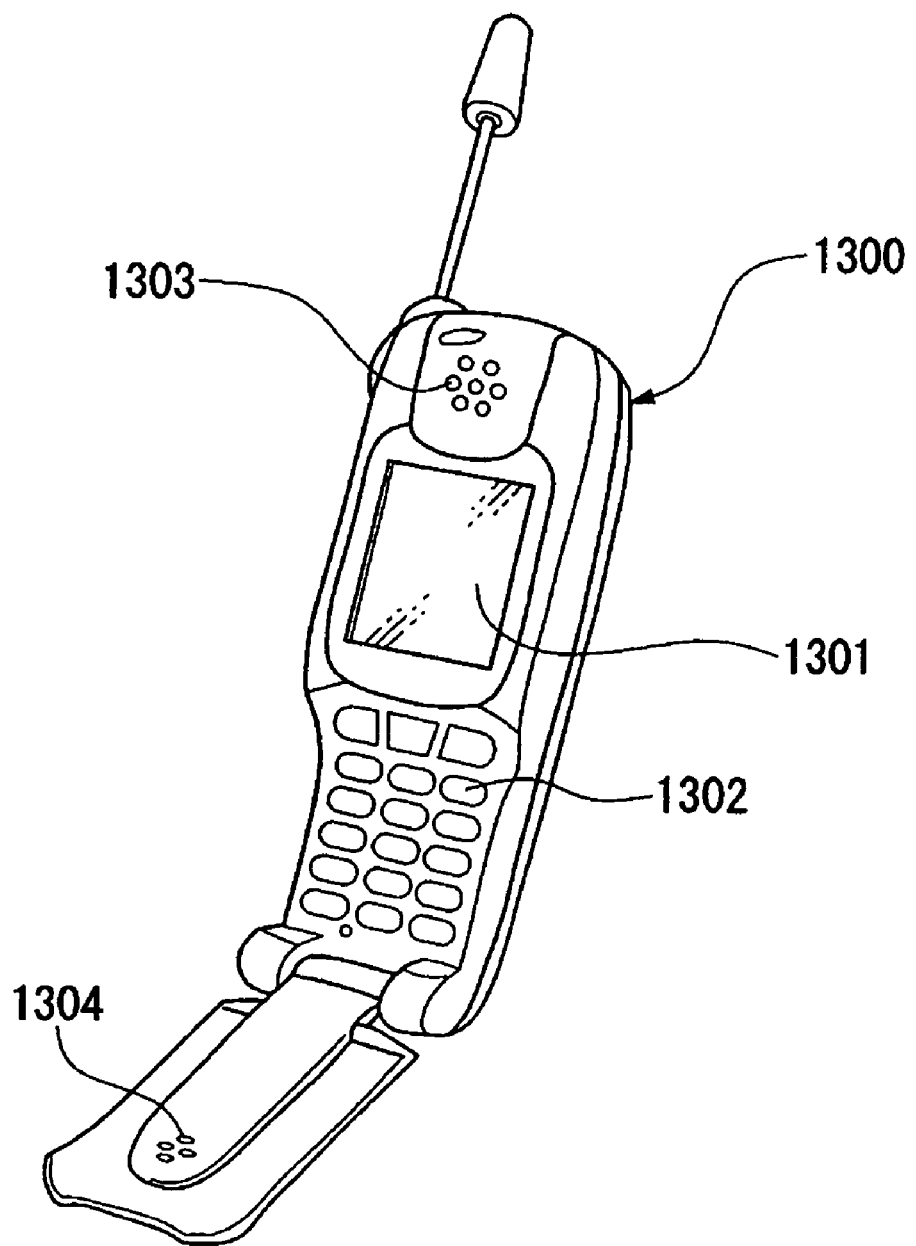
FIG. 12 is a perspective view of the telephone as an embodiment of electronic device in accordance with still another aspect of the present invention.

FIG. 12 is a perspective view showing an example of electronic device related to the present invention. The mobile telephone 1300 shown in the diagram is provided with the above-described electrooptic apparatus as a small-sized display unit 1301, and is also provided with a plurality of operating buttons 1302, an earpiece 1303, and a mouthpiece 1304.

The electronic devices in which the above-described electrooptic apparatus can be used is not limited to the above-described mobile phone, and advantageous application may also be made as an image display device in electronic books, personal computers, digital still cameras, liquid crystal television, video tape recorders with viewfinders or direct-view monitors, car navigation systems, pagers, personal digital assistants, calculators, word processors, work stations, TV phones, POS terminals, and all types of equipment provided with a touch panel. Electronic device with excellent display quality can be achieved in any of these applications.

These inventions can provide electrooptic equipment and electronic device that have excellent display quality.

The technological scope of the present invention is not limited to the embodiments described above and also includes various modification to the embodiments described above within a range that does not depart from the spirit of the invention. In other words, the specific materials, configurations, and other aspects listed in the embodiments are no more than examples, and suitable modifications are possible. Described in the above embodiments, for example, is a method for discharging droplets to a target discharge area by disposing the heads so that the nozzle rows are substantially parallel to the lengthwise direction of a target discharge area, and moving the heads along the width direction of the target discharge area. In contrast, it is also possible to use the method for discharging droplets to a target discharge area and to carry out the film formation method according to the present invention by placing the heads so that the nozzle rows are substantially parallel to the width direction of a rectangular target discharge area, and moving the heads along the lengthwise direction of the target discharge area. Also described in the above embodiments is a method for discharging a liquid whose surface tension or viscosity is lower than that of the functional material in a predetermined area on a substrate prior to discharging the functional material. In contrast, it is also possible to carry out the method for manufacturing a color filter according to the present invention by discharging a liquid with a lower surface tension and viscosity than those of the functional material to a predetermined area on the substrate after the functional material has been discharged.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-127343. The entire disclosure of Japanese Patent Application No. 2003-127343 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of manufacturing a color filter, comprising:
   providing a base having a target discharge area forming a pixel area of the color filter;
   discharging a functional material to the target discharge area on the base to form a filter layer of the color filter within the pixel area, the functional material including coloring ink and a dispersion medium blended with the coloring ink; and
   discharging a liquid separately from the discharging of the functional material to at least a portion of the target discharge area on the base, one of surface tension and viscosity of the liquid being lower than the one of the surface tension and the viscosity of the functional material, the liquid having the same composition as the dispersion medium of the functional material.

2. The method of manufacturing a color filter according to claim 1, wherein
   the discharging of the liquid is performed before the discharging of the droplet of functional material.

3. The method of manufacturing a color filter according to claim 1, wherein
   in the discharging of the liquid, the liquid is discharged toward an edge portion of the target discharge area on the base.

4. The method of manufacturing a color filter according to claim 1, wherein
   the liquid and the dispersion medium include a high boiling point solvent for the coloring ink, the high boiling point solvent having a boiling point of 250° C. or higher at one atmospheric pressure.

5. The method of manufacturing a color filter according to claim 3, wherein
   in the discharging of the liquid, the liquid is discharged only toward the edge portion of the target discharge area on the base.

6. The method of manufacturing a color filter according to claim 1, wherein
   the surface tension of the liquid is lower than that of the functional material.

* * * * *

UNITED STATES PATENT AND TRADEMARK OFFICE
CERTIFICATE OF CORRECTION

PATENT NO.        : 7,625,597 B2
APPLICATION NO. : 11/040004
DATED             : December 1, 2009
INVENTOR(S)       : Yoshiaki Yamada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Second Day of November, 2010

David J. Kappos
*Director of the United States Patent and Trademark Office*